United States Patent
Lowagie

(10) Patent No.: US 11,361,109 B2
(45) Date of Patent: Jun. 14, 2022

(54) DISTRIBUTED BLOCKCHAIN-BASED METHOD FOR THE COLLECTIVE SIGNING OF A FILE BY SEVERAL PARTIES

(71) Applicant: ITEXT GROUP NV, Gentbrugge (BE)

(72) Inventor: Bruno Lowagie, Sint-Amandsberg (BE)

(73) Assignee: ITEXT GROUP NV, Gentbrugge (BE)

( * ) Notice: Subject to any disclaimer, the term of this patent is extended or adjusted under 35 U.S.C. 154(b) by 88 days.

(21) Appl. No.: 16/473,090

(22) PCT Filed: Dec. 14, 2017

(86) PCT No.: PCT/EP2017/082802
§ 371 (c)(1),
(2) Date: Jun. 24, 2019

(87) PCT Pub. No.: WO2018/114586
PCT Pub. Date: Jun. 28, 2018

(65) Prior Publication Data
US 2019/0354724 A1 Nov. 21, 2019

(30) Foreign Application Priority Data

Dec. 22, 2016 (BE) .................................. 2016/5964
Dec. 22, 2016 (BE) .................................. 2016/5965
(Continued)

(51) Int. Cl.
*G06F 21/64* (2013.01)
*G06F 16/14* (2019.01)
(Continued)

(52) U.S. Cl.
CPC ............ *G06F 21/64* (2013.01); *G06F 16/152* (2019.01); *G06F 21/31* (2013.01); *G06F 21/602* (2013.01);
(Continued)

(58) Field of Classification Search
CPC ........ G06F 21/645; G06F 21/64; G06F 21/31; G06F 16/152; H04L 9/0637;
(Continued)

(56) References Cited

U.S. PATENT DOCUMENTS 5,465,299 A * 11/1995 Matsumoto .......... G06Q 50/188
380/30
6,219,423 B1 * 4/2001 Davis .................... H04L 9/3263
380/268
(Continued)

*Primary Examiner* — Sher A Khan
(74) *Attorney, Agent, or Firm* — James Creighton Wray

(57) ABSTRACT

The present invention relates to a computer-implemented method for the collective signing of a file, preferably a PDF-based document, by a plurality of users, said method comprising the sequential realization of the following set of steps for each of said plurality of users: (a) providing the user with said file, and optionally with one or more existing identification strings belonging to said file; (b) determining an identification string belonging to said file based on at least said file and optionally based on said one or more existing identification strings; (c) establishing a document signature based on at least both said identification string belonging to said PDF-based document and a private key belonging to the user; (d) registering said document signature in a blockchain.

15 Claims, 1 Drawing Sheet

(30) Foreign Application Priority Data

Dec. 22, 2016 (BE) .................................. 2016/5966
Oct. 25, 2017 (WO) .................. PCT/IB2017/056624

(51) Int. Cl.

| | |
|---|---|
| *G06F 21/60* | (2013.01) |
| *H04L 9/06* | (2006.01) |
| *H04L 9/08* | (2006.01) |
| *H04L 9/30* | (2006.01) |
| *H04L 9/32* | (2006.01) |
| *G06F 21/31* | (2013.01) |

(52) U.S. Cl.
CPC .......... *G06F 21/645* (2013.01); *H04L 9/0637* (2013.01); *H04L 9/0643* (2013.01); *H04L 9/0891* (2013.01); *H04L 9/3073* (2013.01); *H04L 9/3236* (2013.01); *H04L 9/3247* (2013.01); *H04L 9/3263* (2013.01); *H04L 2209/38* (2013.01)

(58) Field of Classification Search
CPC ... H04L 9/0643; H04L 9/3247; H04L 9/3263; H04L 2209/38; H04L 9/3236
See application file for complete search history.

(56) References Cited

U.S. PATENT DOCUMENTS

| | | | | |
|---|---|---|---|---|
| 7,299,408 | B1* | 11/2007 | Daconta | G06F 40/134 715/234 |
| 7,757,276 | B1* | 7/2010 | Lear | G06F 21/572 726/6 |
| 8,560,853 | B2 | 10/2013 | De Mello | |
| 9,575,622 | B1* | 2/2017 | Allison | G06F 3/0481 |
| 2001/0032314 | A1* | 10/2001 | Ansper | H04L 9/3247 713/176 |
| 2002/0026575 | A1* | 2/2002 | Wheeler | H04L 63/0823 713/156 |
| 2002/0026582 | A1* | 2/2002 | Futamura | H04L 9/3268 713/170 |
| 2004/0123111 | A1* | 6/2004 | Makita | G06F 21/645 713/176 |
| 2004/0221158 | A1* | 11/2004 | Olkin | H04L 9/3236 713/170 |
| 2007/0288393 | A1* | 12/2007 | Boyer | G06F 21/64 705/76 |
| 2008/0034213 | A1* | 2/2008 | Boemker | G06Q 10/10 713/176 |
| 2011/0178837 | A1* | 7/2011 | Goerges | G06Q 10/06 705/7.28 |
| 2012/0089659 | A1* | 4/2012 | Halevi | G06F 3/04842 709/201 |
| 2012/0323717 | A1* | 12/2012 | Kirsch | G06F 21/31 705/26.1 |
| 2014/0019761 | A1* | 1/2014 | Shapiro | H04L 9/3247 713/176 |
| 2014/0164764 | A1* | 6/2014 | Pushkin | H04L 63/0884 713/156 |
| 2014/0379585 | A1 | 12/2014 | Buelloni | |
| 2016/0026827 | A1* | 1/2016 | Ko | G06F 21/6209 713/193 |
| 2016/0212146 | A1 | 7/2016 | Wilson | |
| 2016/0330027 | A1 | 11/2016 | Ebrahimi | |

* cited by examiner

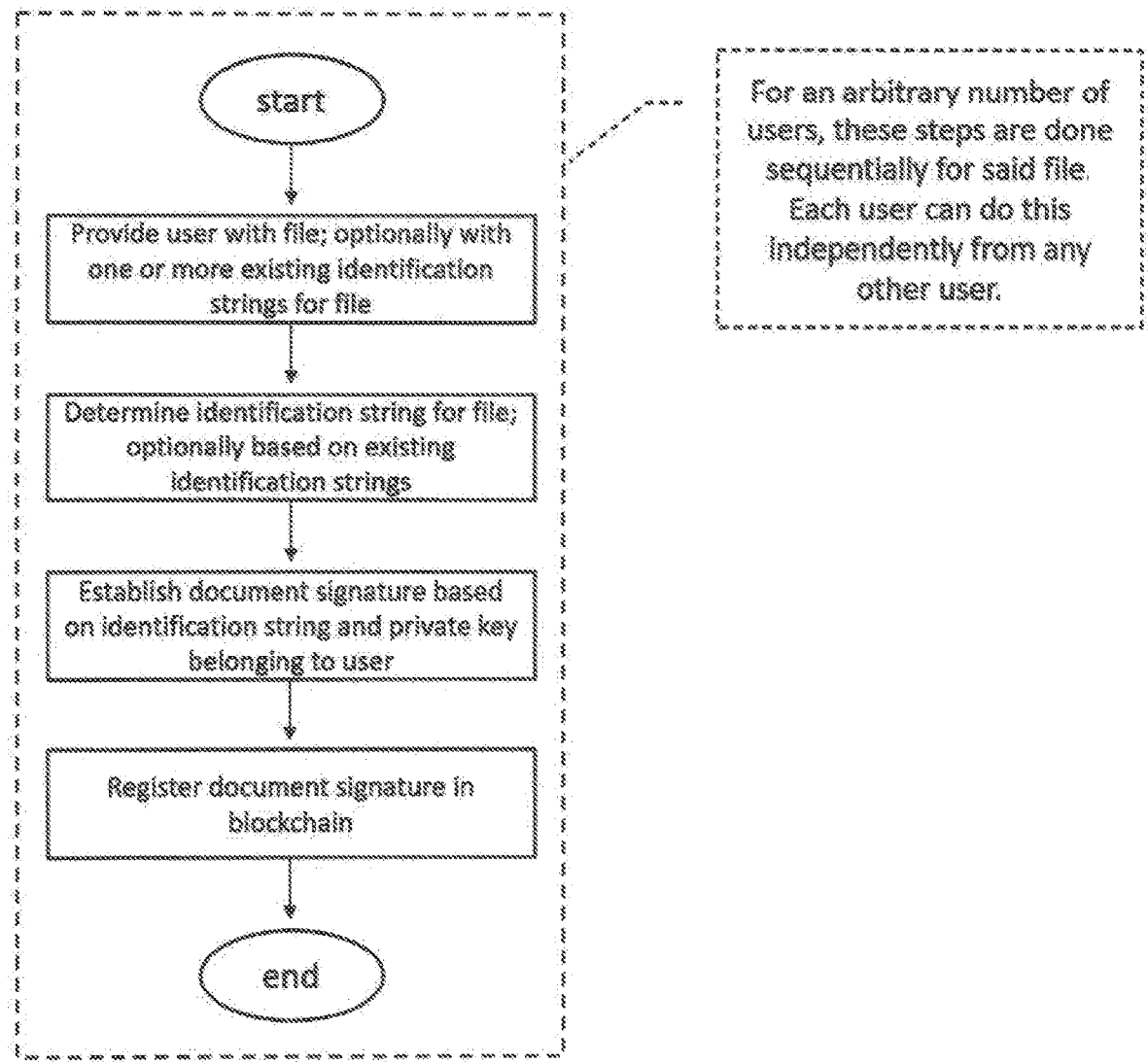

DISTRIBUTED BLOCKCHAIN-BASED METHOD FOR THE COLLECTIVE SIGNING OF A FILE BY SEVERAL PARTIES

This application claims the benefit of Belgian Application No. BE2016/5964 filed 22 Dec. 2016, Belgian Application No. BE2016/5965 filed 22 Dec. 2016, Belgian Application No. BE2016/5966 filed 22 Dec. 2016, PCT/IB2017/056624 filed 25 Oct. 2017 and PCT/EP2017/082802 filed Dec. 14, 2017, International Publication No. WO 2018/114586 A1, which are hereby incorporated by reference in their entirety as if fully set forth herein.

TECHNICAL DOMAIN

The present invention relates to the technical domain of collective signing of a file, preferably a PDF-based document.

STATE OF THE ART

A problem with the known methods for the collective signing of a PDF-based document is the lack of flexibility in the order of signing, causing unnecessary delay when signing. Moreover, the known methods require a central authority for the registration of each signature.

US 2016/0330027 discloses related methods and systems. US 2016/0330027 however lacks means for handling files.

U.S. Pat. No. 8,560,853 discloses techniques with respect to a targeted digital signature policy. It describes a system comprising means for the storage of a document as a number of logic parts. The system also comprises means for recording a document configuration when a digital signature is placed on the document, and means for indicating if the document configuration has been changes subsequently.

A problem with a method according to U.S. Pat. No. 8,560,853 is that no mechanisms are provided for avoiding a central authority such as a CA or a TSA. Also, no flexibility is provided as to the order of signing. Furthermore, a concept according to U.S. Pat. No. 8,560,853 is not adapted to the specific nature of PDF-based documents.

US 2016/0212146 describes systems and methods using a blockchain for recording a file date and for avoiding manipulation, even for documents that are secret and also for those stored in uncontrolled environments. These systems and methods do not require that any confidence is placed in a timestamping authority or a document filing service. A trusted timestamping authority can be used, but even when this timestamping authority loses its credibility or when a third party refuses to recognize the validity of a time stamp, a date for an electronic document can still be specified.

A disadvantage of a method according to US 2016/0212146 is the lack of a mechanism for the collective signing of a document in a distributed context.

The present invention aims to find a solution for at least some of the above-mentioned problems.

There is a need of an improved method for the collective signing of a PDF-based document, in which there is no inflexibility as a result of a fixed order of signing. Also, there is a need of an improved method not requiring a central authority at the collective signing.

SUMMARY OF THE INVENTION

In a first aspect, the invention relates to a computer-implemented method for the collective signing of a file, preferably a PDF-based document (Portable Document Format), by a plurality of users, said method comprising the sequential realization of the following set of steps for each of said plurality of users:

(a) providing the user with said file, and optionally with one or more existing identification strings belonging to said file;

(b) determining an identification string belonging to said file based on at least said file and optionally said one or more existing identification strings;

(c) establishing a document signature based on at least both said identification string belonging to said file and a private key belonging to the user;

(d) registering said document signature in a blockchain;

in which said identification string at least allows to identify said PDF-based document uniquely with respect to the blockchain, in which said establishing in step (c) comprises encrypting said identification string by means of said private key belonging to a key pair belonging to said user for obtaining a signed identification string, said key pair comprising said private key and a public key, in which said document signature comprises said signed identification string; in which said document signature comprises a user identity for retrieving said public key; and in which said collective signing is realized when step (d) has been carried out for each user.

Hereby, and for all related instances in this document, it is clear to the skilled person that the plurality of users concerns more than one user. An interpretation with only a single user is void of meaning in the context of the present invention, and moreover the presence of more than one user is implied by said "collective" nature of said signing. Moreover, it is to be noted that US 2016/0330027 lacks any provision for handling files, whereby "PDF417" mentioned therein relates to a stacked linear barcode symbol format, and not to the well-known portable document format. This contrasts with the present invention, which is aimed specifically at handling files, such as PDF-based documents.

Two crucial advantages of such a method are the decentralized character of each document signature, and the parallel character of the diverse signatures with respect to each other.

Thanks to the decentralized character, the document signature can be considered as a decentralized electronic signature. This allows an integral decentralized method, that each time a user signs, leads to the recording of the identity of the signer and the time of signing. The present invention is hereby based on a blockchain, a proven technology allowing irreversible, incontestable and distributed recording of signatures, in which it is typical for the operation of the blockchain that this distributed recording is also provided with a non-adaptable and incontestable time stamp. This is in contrast to a method of the state of the art, in which at least one of these aspects either is not treated or is treated according to a centralized model. Thanks to the parallel character, the invention offers a solution for the problem that an order is imposed when placing a signature, even if this order has no benefit to any of the parties. This problem occurs in a common way of working, in which the electronic signature is sent together with the document, typically as part of the document. This is problematic because it requires the different signing parties to place the signatures "in series", resulting in a delay in the settlement. The present invention allows to have the signing parties sign in parallel. This enables a significant gain in time. Moreover, it leads to a simpler use, reducing the entire process of signing to a simple invitation to all parties to sign, in a first step, with separately returned signatures as a reply, in a second step. A related illustrative example has been described in the detailed description.

Another related advantage is the better overview for a user of his/her signatures. In common practice in which signatures are sent together with the file, preferably the PDF-based document, a user cannot verify if he/she is the only one signing files/documents with his/her private key. As a result, a possible theft of a private key is sometimes only revealed very late. On the contrary, a method of the present invention allows that a user carries out a search that is specific for his/her own public key on the blockchain, and in this way, finds out if signatures have been registered that are unknown to the user. In the latter case, the user can then immediately take measures, strongly limiting the risk of later problems.

Another advantage of the present invention is the decentralized approach of signing, with provisions for non-repudiation. The signing of the document comprises the application of Public Key Infrastructure (PKI). Because the user encrypts the identification string with his/her own private key, a receiver of the encrypted hash can verify by means of the unlimitedly available public key if nobody else than said user has encrypted the particular hash. A signature with the private key can thus be reduced to an action of the owner of that private key, which is important when realizing non-repudiation.

Another advantage of the invention is that there can never be a conflict amongst the collectively signing users as to the content of the file or document, preferably the PDF-document. Each document is indeed identified by an identification string for which it has been specified that it is unique with respect to the blockchain. In a preferred embodiment, this uniqueness is guaranteed by the use of a hash function and/or an identification string and/or a document ID pair. Thus, the invention offers a solution for the problem that, after the collective signing, a party can claim that the document that he has received, had an adapted content with respect to the version that the other parties have received. In a preferred embodiment, it is guaranteed by means of explicit provisions that the identification string is unique with respect to the blockchain. It can for example be about substeps in which the document ID pair is adapted iteratively until both the hash and the document ID pair are unique with respect to the blockchain (see below), if exceptionally it would seem that the hash is not unique with respect to the blockchain.

An additional advantage of the invention lies in its advantageous avoidance of registering personal information in the blockchain. Since only identifiers of the document, and not the actual contents of the document is stored in the blockchain, there is no risk of having the contents disclosed when, for instance, a security-related algorithm is outdated and/or hacked. This is important particularly in view of the General Data Protection Regulation (GDPR) (Regulation (EU) 2016/679) which requires that, upon request of a citizen, personal information is removed. In view of the GDPR, direct registration of personal information in the blockchain should be avoided, since such registration cannot be removed afterwards.

In a preferred embodiment, said file is a PDF-based document. This is advantageous owing to the well-known platform-independent and hence reliable representation of documents enabled by the PDF format. For this reason, PDF-based documents constitute a popular class of documents commonly used in official procedures, wherein the signature of a plurality of parties is attributed to a file which is viewed by all the parties in an identical way, regardless of the hardware and software used by the party when viewing the document.

In a preferred embodiment, said collective signing is realized when step (d) has been carried out for each user and this regardless of the sequence in which each of said plurality of users has signed. This corresponds to each of the plurality of users essentially signing in parallel, and is referred to as the parallel character of the invention. This contrasts with an embodiment wherein the users sign the file in a pre-defined order. This is equally possible with a method according to claim 1, since the "sequential realization" of steps (a)-(d) relates only to the signing of the file by a single user, and does not limit the sequence in which the users sign the file. Hence, an embodiment wherein the users sign the file in a pre-defined order equally falls within the scope of claim 1, and would preferably further comprise some additional means to enforce the pre-defined order. Such additional means may be implicit in that the pre-defined order may boil down to a simple agreement between parties made by telephone or e-mail. In other cases, such additional means may relate to an automated system and/or an intermediary planning system such as a CRM system or an ERP system, which can easily be adapted to this end with state-of-the-art techniques familiar to the skilled person.

In a preferred embodiment, said plurality of users comprises at least three users. As the number of collectively signing users increases, the parallel character of the invention leads to increased benefits when compared to the state of the art. This holds true for users signing without regard to the sequence in which they sign, regardless of whether step (a) comprises, according to a preferred embodiment, for at least one user belonging to said plurality of users, providing an existing identification string, that is an identification string signed by another user belonging to said file (or, equivalently, said document), preferably said PDF-based document, in which said other user belongs to said plurality of users and is different from said user; and in which said determining of the identification string of step (b) for said at least one user takes place based on at least said identification string signed by another user.

In a second aspect, the invention relates to a use of the method according to the present invention for building a history with respect to a document such as an identity-related document, in which said collective signing corresponds to the adding of a document signature when logging in at a document-related instance such as a customs check or a civil affairs department. At a similar use, said plurality of users is at each time extended with the signing by a new document-related instance. Such a use has the advantage that the logistic processes as known at the customs check and administrations of authorities are strongly simplified, for example because no need paper document is needed. Moreover, the history of different registrations is automatically listed in the blockchain, instead of on a physical support such as the identity-related document. This allows the registration to be more easily available for a service such as the customs check or an authority, and that potential problems thus can be detected faster. Related embodiments are further described in the detailed description.

In a third aspect, the invention relates to a system for the collective signing of a file, preferably a PDF-based document, by a plurality of parties, said system comprising a plurality of mutually linked devices, each of the devices comprising a processor, tangible non-volatile memory, instructions in said memory for controlling said processor, a client application, in which for each device, the client application is configured for carrying out a method according to the present invention, in which a user identity for retrieving a public key for at least one of the users is linked one-to-one to the client application on the device belonging to said user.

Such a system has the advantage that a more controllable environment can be created, allowing to take fast action in diverse situations, such as the case of a compromised HSM.

In a fourth aspect, the invention relates to a computer program product for carrying out a computer-implemented method for the collective signing of a file, preferably a PDF-based document, by a plurality of users according to the present invention, which computer program product comprises at least one readable medium in which computer-readable program code portions are saved, which program code portions comprise instructions for carrying out said method.

Further preferred embodiments of the present invention will be described in the detailed description and the claims.

BRIEF DESCRIPTION OF THE DRAWING

FIG. 1 shows steps of the invention.

DETAILED DESCRIPTION

In a preferred embodiment, the file is a "PDF-based document", that is, a digital file based on the "Portable Document Format" file format. The category of PDF-based document comprises all PDF documents, but also all other files comprising portions of code relating to the PDF standard. Below, you will find a non-limiting list of examples. A first example of a PDF-based document is a PDF document. A second example is a PDF portfolio, a container format that is appropriate for comprising several PDF files and related data. A third example is an XFA file (XML Forms Architecture), a mark-up language in which a dynamic form is made in XML (eXtensible Markup Language), but in which the XML code is compressed and saved in a PDF file. Such a XFA file can be processed by PDF processors supporting the XFA specification. A fourth example is a successor or variant to the present PDF file format, of which the aim is similar to that of the present PDF file format.

FIG. 1 shows the steps that each user takes separate and independently from other users.

In the context of the present document, a user ensures the "signing" and "registering", also called "registered signature" of a file, preferably a PDF-based document. The "author" of the document is the person or entity who has written the document and/or to whom the document belongs. In this respect, it is always assumed that the user and the "author" are directly related. It will however be clear that this includes a multitude of embodiments of the present invention, and that the user can for example be a person working together with the author and carrying out the registered signature on behalf of the author, but not being the owner of the document. It is for example also possible that the author is not an individual, but for example a company, in which the user is then for example an individual worker of the company, who is at the same time not the person who has written the document. Furthermore, the author need not be or represent a physical person, and may as well be a machine, e.g. a computer running an appropriate automated algorithm.

In the present document, the term "hash" refers to a second bit string, an output string, that is obtained by having a cryptographic hash function act upon a file, preferably a PDF-based document, corresponding to a first bit string, as input string. The terms "hash function" and "hashing algorithm" are hereby equivalent. For being significant, this hash function has to convert the long first bit string into a (much) shorter second bit string. Furthermore, the chance that the hash already figures as a hash of another file, for instance another PDF-based document, must be very low, so that the hash can be a useful form of unique "finger print" of the document. This "finger print" is usually referred to with the term "message digest". It should also be impossible to reconstruct portions of the original document from the obtained hash, i.e. the hash function should be "one-way". In a preferred embodiment, the cryptographic hash function is thus a function meeting all of these criteria, such as an algorithm belonging to the family of Secure-Hash-Algorithms (SHA), more preferably SHA-256. Hereby, it should be noted that the possibility of a non-unique hash cannot be excluded theoretically; when two non-identical documents correspond to the same hash after separate application of the same hash function, this is called a "hash collision". This is to be distinguished from the case where two documents are completely identical, i.e. with contents including file identifier identical. This leads to identical hashes but is not typically referred to as hash collision. In a preferred embodiment of the present invention, the invention comprises provisions for taking into account the possibility of identical hashes, whether caused by hash collision or not, for example by using a supplementary hash and/or using a document ID pair.

In the present document, the terms "public key" and "private key" refer to aspects of Public Key Infrastructure (PKI). PKI is used for recording the identity of a person or organization. PKI comprises the use of a key pair comprising two keys:
- a private key that must be kept secret by the owner of the private key. This private key is typically saved on a Hardware Security Module (HSM) and/or smart card and/or USB token and/or similar device of which it cannot be retrieved;
- a public key that can be shared with the world, and comprises information about the owner.

The private key can never be retrieved based on the public key, they form a pair because a message that has been encrypted with the one key can only be decrypted by means of the other key. In the context of the present invention, such a key pair is used for signing a hash. By signing the hash with the private key, it is possible for a receiver of the encrypted hash to retrieve the original hash, by using the public key, which, in a method of the present invention, can be retrieved based on the user identity. If such decryption is successful, nobody else than the owner of the private key can encrypt the hash. In this way, the receiver is thus certain of the origin of the encrypted hash.

In the context of the present document, the terms "document reference", "document signature" and "file signature" are used interchangeably. The terms "file" and "document" are also used interchangeably. Likewise, the term "file ID pair" and "document ID pair" are interchangeable. Hence, the term "document" should never be interpreted as limiting the invention to files that adhere to some narrow interpretation of the term "document", and hence always refers to "files" in the broadest sense of that word, being a string of binary digits adapted to be stored on electronic means or exchanged on a digital electronic network.

In this document, the term "blockchain" refers to a distributed database keeping a continuously growing list of registrations in blocks, which are specified incontestably, are kept up to date and cannot be adapted. Hereby, it is immaterial which variant of blockchain is intended, and all distributed ledger technology (DLT) may serve as the blockchain mentioned in claim 1. Moreover, in a preferred method, the present invention is agnostic with respect to the specific blockchain used, and may be applied to any of a wide range of blockchain types without requiring alteration. In a preferred embodiment, the use of multiple blockchain types is possible concurrently, with e.g. a system that has access to multiple blockchains and registers a file A in blockchain A for user A while registering a file B in blockchain B for user B. Related, the term "blockchain" and "distributed ledger technology" are used interchangeably in this document. This includes all common types of blockchains and related ledgers known to the skilled person. Hereby, it may concern a permissionless or permissioned blockchain, a public or private blockchain, a blockchain with centralized, decentralized, or distributed ledger control. The consensus mechanism involved in the adding of data to the blockchain preferably concerns distributed consensus. This may involve proof-of-work but may also and/or alternatively involve any of the following: proof-of-stake, a leader-based system, a voting-based system or a principle based on hashgraph.

In a preferred embodiment, without limiting the scope of the invention, the blockchain, as distributed ledger technology, fulfils following conditions:
  The records can be replicated over multiple nodes in a network (decentralized environment).
  New records can be added by each node, upon consensus reached by other nodes (ranging from one specific authoritative node to potentially every node).
  Existing records can be validated for integrity, authenticity, and non-repudiation.
  Existing records can't be removed, nor can their order be changed.
  The different nodes can act as independent participants that don't necessarily need to trust each other.

Hereby, a node is a connection point in a distributed network that can receive, create, store or send data from and to other nodes in that network; a ledger is a collection of permanent, final, definitive records of transactions; and a ledger record is an entry in the ledger containing information about one or more transactions. As for instance permissioned ledgers equally fall within the scope of the present invention, alternative embodiments exist for which one or more of the above conditions are not fulfilled and/or are replaced by different additional conditions. Moreover, in the context of the present invention, a ledger which does not allow keeping track of the entire history of a file but only of recent signatures may be useable for the purpose of the invention. Hence, in one embodiment, the blockchain relates to a hashgraph wherein not the entire history of the ledger records is available at all times.

In this document, the blockchain refers to any distributed database based on consensus, such as the bitcoin blockchain. In the context of the present document, the registrations relate to file signatures (or, equivalently, document signatures); in the known case of bitcoin, the registrations relate for example to transactions. The database is saved and maintained at a multitude of nodes, that each separately take part in the calculations that are necessary for expanding the list of registrations. It is inherent to the design of the blockchain that none of the nodes make adaptations to the existing list of registrations, that, when recording, a time or "time stamp" is associated to each of the registrations. Strictly speaking, these adaptations are possible, but only provided that a certain condition is met, e.g. when the majority of the calculation represented force in the nodes "conspires", which becomes more improbable as the blockchain gets larger and knows more users. Because of the advantageous characteristics, a blockchain can serve as "distributed ledger".

In the present document, the term "web-of-trust" refers to a decentralized cryptographic model and related distributed system for relating in a reliable way a public key to a user, and by extension, considering a user identity as being reliable. In an embodiment of a web-of-trust of the present invention, a particular user identity is reliable if a sufficient number of user identities already belonging to the web-of-trust consider the particular user identity as being reliable. Hereby, said number can be considered as sufficiently large if it exceeds a predefined number. Related, the term Certificate Authority (CA) relates to an authority who maintains records regarding the user identity. Particularly, the CA may keep a record of the identity of each of a plurality of users by keeping track of at least the private key belonging to the user's key pair. This may involve maintaining certificates. While a web-of-trust and a certificate authority are clearly different, in the context of the present invention, they are alternative and interchangeable means for the verification of a user's identity, said verification preferably based on the knowledge of a user's public key.

In this document, "CRM" refers to "customer relationship management", and "ERP" to "enterprise resource planning".

"A", "an" and "the" refer in the document to both the singular and the plural form unless clearly understood differently in the context. "A blockchain" means for example one or more than one blockchain.

According to several aspects set out in the summary section, the present invention provides computer-implemented methods, systems, uses of the computer-implemented methods according to the present invention, preferably in the systems according to the present invention, and a related computer program product. One of ordinary skill in the art may appreciate that the computer-implemented methods comprise steps which the server or a user device or the system may be configured to execute, and that the computer program product comprises according instructions. One of ordinary skill in the art will furthermore appreciate that the according systems are configured for performing the steps of the computer-implemented methods. Therefore, in this document, no distinction is made between the different aspects of the present invention, and each element of the disclosure may relate to each of the different aspects of the present invention.

As said in the summary above, the parallel character of the invention offers a solution for the problem that an order is imposed when placing a signature. This problem occurs at a common way of working, in which the electronic signature is sent together with the document, typically as part of the document. The following example of a publisher that asks some authors to sign a contract as a co-author clearly shows that this is problematic. According to the present PDF standard, the publisher should first have the contract signed by the first author, subsequently by the second author, etc. This is complex and time-consuming. If the response for each author takes a time T and there are N authors, then, the collective signing takes at least a time N*T. Moreover, it should thereby be agreed upon how the document that must be signed, is exchanged. According to a first way, the document to sign is always sent to the publisher after each signing. This is convenient for the authors, but it creates an unnecessary workload for the publisher. According to a second way, the document is sent from author to author according to a predefined "chain", which is complex for the authors, and will quickly lead to errors. Both ways of working are time-consuming because the signatures are settled in series. According to the improved method of the present invention, the signatures are settled in parallel, in which the document can be signed in parallel by each party, without the timing of one party having to depend on the timing of another party.

In a preferred embodiment, said determination in step (b) comprises the calculation of a hash from said file/document, preferably said PDF-based document, by means of a cryptographic hash function, in which said identification string is determined based on at least said hash. In a preferred embodiment, the identification string comprises said hash. This has the advantage that the user himself can verify if the unique identification string and the document effectively belong together. Indeed, the hash forms a "finger print" of the document. Each user can thus himself apply the cryptographic hash function to the document, and can verify if the obtained hash corresponds to the hash that is present in the unique identification string. In this way, the invention offers a solution for the problem in which a receiver of a document does see that the unique identification string is unique with respect to the blockchain, but cannot verify if the link between this identification string and the document is correct. Please note that hereby, it is not important if the content of the document is confidential or accessible for the public, as in the method, no portions of the actual document are registered in the blockchain.

Diverse embodiments in which said unique identification string comprises said hash, have the additional advantage that at each signature, not only the time, but also the content of the document is recorded. This can avoid mistakes when presenting a document, for example when a user signs a newly drawn-up document and subsequently wants to submit it for further collective signing, but erroneously takes the wrong document, and inadvertently presents a similar older document that had been signed previously and that had been submitted for further signature. In a method of the state of the art, no measures have been taken for avoiding this problem. In the present invention, this is avoided because when signing the document, it becomes clear that the hash corresponding to the document is already present in the blockchain, thanks to the earlier signature(s). As in a preferred embodiment, it can be guaranteed that the hash of the document is unique with respect to the blockchain, the document is thus "logged in" at the blockchain at the first signing. A further signature thus also constitutes a kind of "confirmation" of the content. This will also be further discussed in a use of the present invention.

Another advantage of the method of the present invention is that there is no need for a Timestamp Authority (TSA) controlling the attribution of time stamps, which is typically the case in a method of the state of the art. The use of such a TSA is thus unnecessarily complex. Related thereto, in several embodiments of the present invention, there is also no need for a Certificate Authority (CA) controlling authorship. The use of such a CA may in several cases be unnecessarily complex.

Another advantage of the present invention is that the blockchain realizes in this way a user-friendly and transparent inventory of signed documents. First of all, a simple search for documents signed by a particular user can immediately provide a whole list of signatures to anyone having access to the blockchain. This can also allow to identify possible duplicate document signatures, i.e. documents that have been signed more than once. Furthermore, in an embodiment in which the non-encrypted (or, equivalent, non-signed) hash has been included in the document signature, a search can also very simply be carried out for this hash, in order to find out if the document has been registered, and if there aren't any problems with it, such as for example in case several signatures are present in the blockchain that to not logically relate. The same advantage can also be realized by using a unique document ID pair according to the present invention. Note that such a search is also possible in an embodiment with a document signature without document ID pair or non-signed hash, in which (next to the user identity) only the signed hash is included in the document signature. In such case, one can imagine a system of the present invention which previously calculates the non-signed hash for the relevant document signature based on the public key, that can be retrieved via the user identity. Such a system would for example, for any new document at the time when it becomes available from the encrypted hash, calculate the non-encrypted hash.

Another advantage of the present invention is that document signatures are collectively available, so that anyone having access to the blockchain, can see details about the used type of hash function and/or PKI encryption and/or technique for signing. If a particular technique is known not to be considered as trustworthy any more, large groups of users can immediately be informed about it, and by extension, they can be encouraged to "renew" the signature of their existing documents by means of another, more secure technique. It can also be easily verified of this "renewal" is actually carried out. Such a large-scale problem identification is inconceivable in a case in which electronic signatures are sent together with the actual document.

In a further preferred embodiment of the method according to the present invention, step (a) comprises, for at least one user belonging to said plurality of users, providing an existing identification string, that is an identification string signed by another user belonging to said file, preferably said PDF-based document, in which said other user belongs to said plurality of users and is different from said user; and in which said determining of the identification string of step (b) for said at least one user takes place based on at least said identification string signed by another user. This embodiment allows a flexible intermediate form of signing, in which some users belonging to said plurality of users are signing in parallel, whereas others explicitly are signing "in series". In a preferred embodiment in which the identification string relates to the hash of the document, a first user for example signs first, after which both a second and a third user sign the hash signed by the first user by means of their own private key. In this way, a precedence has been explicitly created: the first user signed first, and the second and third user only signed when it was certain the first user had signed. An advantage thereof is that it allows users to meet possible legal and/or strategic requirements with respect to the order of signing. This was already possible in the state of the art, but only in an inflexible way, in which the users had to sign one by one, causing extra delay. The present invention allows to meet the requirements with respect to the order in a flexible way, in order to handle the process of signing as fast as possible. Note that in an embodiment in which each user signs the original (non-signed) hash, the precedence is also established. This is indeed easy to find out via the respective time stamps of the signatures on the blockchain. The signing of a hash that has already been signed by another user however constitutes an explicit confirmation that one is aware of the signing by the other user. When signing has taken place in this way, in case of disputes, it is difficult to claim that one was not aware of the signing by the other user.

As said above, it is guaranteed in a preferred embodiment by means of explicit provisions that the identification string is unique with respect to the blockchain. In an alternative embodiment, such measures are however not taken, for example because a sufficiently advanced hash function is used, as a result of which the risk of hash collision can be neglected. Even in such an alternative embodiment, problems with the uniqueness of the identification string can easily be avoided. A possibility is the use of said document ID pair. Another possibility is the inclusion, in the identification string of the file, next to the result of the hash function, of also another characteristic of the registration as a form of "supplementary hash". In a preferred embodiment, such a supplementary hash comprises a time stamp that relates to the present and a previous registration, preferably the first registration of the file in the blockchain. In a further preferred embodiment, the supplementary hash comprises data relating to any other characteristic of the present or a previous registration, such as a user identity. It should further be noted that an embodiment is even possible in which the identification string is only composed of the hash of the document and in which no checks are carried out as to the uniqueness of the hash. When using a sufficiently advanced hash function such as SHA-256, the risk of hash collision is indeed negligibly small. Should such a collision still exceptionally take place, then this hash collision can be easily detected by searching in the blockchain.

In an alternative embodiment, both a (default) hash and a supplementary hash is provided, in which the hash is linked to a (default) hash function, and the supplementary hash that is linked to a supplementary hash function is different from said (default) hash function. Both hash functions are carried out on the file and thus lead to two different hashes, which are included in the identification string. The advantage of such a method is that it guarantees the security if one of both hash functions is compromised. If, for example, the (default) hash function gets compromised since the signing, then, it can be possible to make changes in the document without changing the corresponding (default) hash. This is problematic, because then a conflict can occur about which of both documents has been signed in the past, the original document or the adapted document. By providing a supplementary hash function, this problem can be avoided. As long as this supplementary hash function is not compromised, this offers another supplementary hash at the adapted document as well as at the original document. In this way, the adaptation in the document can still be detected, and the conflict can be solved.

In a method of the present invention, the document signature comprises a user identity for retrieving the public key belonging to the user. In a preferred embodiment, the user identity comprises the actual public key. In an alternative embodiment, the user identity only comprises a key-related reference allowing a user to link a user identity to the public key. The user identity could for example comprise a user identification number, which is linked to one or more public keys such as said public key via a related aspect of the invention, for example by means of a web-of-trust and/or a second blockchain or exactly the same said blockchain.

In a further preferred embodiment, said blockchain is publicly accessible. This has the additional advantage of an increased transparency. For users, it allows them to publicly provide the list of documents that are signed by the user within the secure context of the present invention. For receivers and consumers of documents, it provides a useful instrument for verifying the integrity, authenticity and non-repudiation of a particular document, without any restrictions as to the access to the blockchain.

In a further embodiment, said blockchain is the same for each of said plurality of users. This has the advantage that one single blockchain constitutes the reference for all signatures, with increased transparency for the users as a result. In an alternative embodiment, the document signatures are spread over more than one blockchain. This is for example possible in case the users are spread over different countries or continents, each attaching value and/or authority to a particular, possible mutually different blockchain. In such a case, the present invention can fully be applied.

In a further preferred embodiment, the document signature comprises said non-encrypted hash as obtained in step (b), i.e. the non-encrypted hash. This has the advantage that searches with respect to a document can be carried out in a very simple way, without having to know the user of the document and his public key.

In a further preferred embodiment, said registration in step (d) is realized provided that said user identity belongs to a plurality of user identities that have been registered in a web-of-trust and/or with a Certificate Authority. This has the advantage that document signatures in the blockchain already comply with a certain quality mark when specifying them. This preferred embodiment is preferably associated with the use of a blockchain that is adapted for signed registration of files, e.g. for signing PDF-based documents, rather than a blockchain that is already in use for another aim such as the bitcoin blockchain.

In a preferred embodiment, said web-of-trust is at least partially registered in said blockchain. Such an embodiment has the advantage that no separate model should be used for the web-of-trust, which improves the simplicity. Moreover, the web-of-trust has in this way the known advantages of the blockchain, allowing irreversible, incontestable and distributed recording of the user identity related data, including timestamping.

In a further preferred embodiment, said file, preferably said PDF-based document, comprises a document ID pair comprising a first document ID and a second document ID, in which the identification string determined in step (b) comprises said document ID pair, in which said document ID pair is unique with respect to the blockchain. This has the advantage that the document can be identified and retrieved by means of an identification that is comprised in the document itself, rather than to be external thereof, such as in the case of a hash. This has the advantage that the user disposing of only a document, is not required to provide for provisions to calculate a hash, and can also inquire the blockchain purely based on the document ID pair. The document ID pair can be determined at the first registration of the document in the blockchain, thus the first signing of the document in the blockchain. In a more further preferred embodiment, step (b) comprises determining a document ID pair, in which said calculation of the hash is carried out for a modified version of said PDF-based document comprising said document ID pair and the PDF-based document received in step (a), in which said document ID pair comprises a first document ID and a second document ID, in which said first document ID is determined taking into account a document ID pair of an earlier version of said PDF-based document, if existing, and in which said second document ID is at least determined in such way that both said document ID pair on the one hand and said hash on the other hand are unique with respect to the blockchain, and that said document signature that has been specified in step (c) comprises said document ID pair. In a preferred embodiment, said "being unique" is realized according to the following substeps, all belonging to step (b):

(b.i) choosing a second document ID so that the document ID pair is unique with respect to the blockchain;

(b.ii) calculating the hash belonging to a modified version of said PDF-based document comprising the PDF-based document received in step (a) and the document ID pair resulting from substep (b.i);

(b.iii) determining if the hash obtained in step (b.ii) is unique and if so, ending step (b), if not, resuming step (b.i).

Such an embodiment has important additional advantages. First of all, by verifying the uniqueness, the problems of a possible hash collision are avoided. At least equally important is however the possibility for a user to create a 'family' of documents, in which the first version of a document is related to one or more more recent versions of the same document, as a result of which they have one and the same first document ID in common. This has the advantage that the blockchain can be even more useful for a user or a receiver for searching details with respect to a document. In a preferred embodiment, the document ID pair can be chosen in such way that as to aspects of notation such as length and allowed characters, it corresponds to already existing notations for document ID pairs. In an alternative embodiment, the first document ID can be chosen equal to the hash belonging to an earlier version of the relevant document, whether or not combined with parts of a user identity, and/or the second document ID can be chosen equal to the "new" hash belonging to the relevant document. This offers advantages as to the traceability of documents. This preferred embodiment is preferably also combined with the use of a blockchain that is specifically adapted for collective signing of files, preferably the collective signing of PDF-based documents.

In a related further preferred embodiment, said file is a PDF-based document, wherein said document ID pair comprising a first ID and a second ID; wherein said file ID pair preferably concerns an ID array corresponding to ISO 32000-1 and/or ISO 32000-2 comprising a first byte string concerning a first file identifier and a second byte string concerning a second file identifier, wherein said ID array is not encrypted independent of the fact whether or not a portion of said file has been encrypted; wherein said first ID concerns a permanent ID for identifying an original version of said file; wherein said second ID concerns a changing ID for identifying an adapted version of said file; and wherein said creating and/or revising of the second document ID, preferably in step (b.i), involves revising solely said second ID so that said document ID pair is made unique with respect to the blockchain while preserving the first ID.

In a related alternative embodiment, it is not step (b), but step (c) that comprises the determining of a document ID pair belonging to said document signature, in which said document ID pair comprises a first document ID and a second document ID, in which said first document ID is determined taking into account said hash and/or a hash of an earlier version of said file, preferably said PDF-based document, if existing, and in which said second document ID is at least determined in such way that said document ID pair is unique with respect to the blockchain. This embodiment leads to similar advantages as the one described above, in which the document ID pair is determined in step (b), except that it is possible in this embodiment that the obtained hash is not unique with respect to the blockchain, and that a hash collision thus occurs. However, the document ID pair is always unique, as a result of which the problems of hash collision can be avoided, by considering the document ID pair, and not the hash, as a unique characteristic.

In a further preferred embodiment, said private key is saved on a hardware security module (HSM) and/or smart card and/or USB token and/or similar device. This reduces the risk of theft of the private key.

In a preferred embodiment, a replacement of said key pair belonging to said user by a new key pair belonging to the same said user comprises a registration on said web-of-trust and/or with said certificate authority. This has the advantage that said web-of-trust and/or said certificate authority can group the documents of one and the same user under one and the same user identity, with larger simplicity as a result.

In a preferred embodiment, said blockchain overlaps at least partially with the technology of the bitcoin blockchain. This has the advantage that an existing system can be further developed. As a result of the nature of the blockchain, in which data can be adjusted inappropriately only if certain conditions are met, e.g. if a majority of the calculation force represented in the nodes "conspires", it can be advantageous to make use of a similar large blockchain as the bitcoin blockchain. In a large blockchain, it is indeed very improbable that a majority of the calculation force is taken over by an attacker.

In a further preferred embodiment, said cryptographic hash function belongs to the family of Secure-Hash-Algorithms (SHA), more preferably SHA-256. The algorithm has the advantage that it has been proven and that efficient algorithms are available for carrying out hashing.

In a further preferred embodiment, said document signature comprises a supplementary hash that is different from said hash as obtained in step (b) and different from said signed hash. In a possible embodiment, said supplementary hash can be used for avoiding potential problems with hash collision, by using not only the hash as obtained in step (b), but the combination of this hash with the supplementary hash as a unique identification.

According to another preferred embodiment, said document signature comprises one or more signing-specific characteristics such as a status with respect to said document and/or said document signing. This has the advantage that the invention can be used in a more flexible way for various kinds of use. A kind of use is illustrated in EXAMPLE 2.

In a further preferred embodiment of a system of the present invention, at least one of said plurality of devices comprises a hardware security module and/or smart card and/or USB token and/or similar device. This has the advantage that the risk of theft of the private key is limited.

In a further preferred embodiment of a system of the present invention, the fact that a user identity linked to a client application is compromised, leads to the removal of said compromised user identity from said plurality of user identities that have been registered in said web-of-trust. This leads to a better organization of said web-of-trust.

In a preferred embodiment, said sequential realization of said set of steps for a first of said plurality of users comprises a trigger for sequentially carrying out said set of steps for one or more of the other users. This clearly contrasts to the case in which the signing is carried out essentially independently, with as the only link that the realization is carried out as soon as each of the users has carried out step (d). In a preferred embodiment, a first of said plurality of users however carries out all steps (a) to (d), and the registration in step (d) preferably leads to the generation of a notification at one or more or even all of the other users. This notification can for example be transferred via contact details that are linked to the user identity, whether or not linked to a collective registration in a web-of-trust and/or a Certificate Authority. After receipt of said notification, said one or more or even all of the other users can carry out steps (a) to (d), whether or not simultaneously. Each time a user has carried out step (d), this can again lead to a notification at other users. This notification can for example only be delivered to the users that have not signed yet, but can also be delivered at those who have already been signing. When all users have signed, the validity of the file has been renewed.

According to a further aspect of the invention, that is not intended to limit its scope in any way, the invention relates to methods and systems using more than one blockchain, preferably at least two blockchains. Of these blockchains, at least one, hereafter referred to as the "draft blockchain" is used for registering documents with authentication needs. This blockchain is intended to provide a user with a registration of drafts of the document, with "authentication signatures". These drafts may require registration for several reasons, such as having proof of the existence of the draft, and to have an authenticated document whereof the related user, preferably the author, is known and registered. This draft blockchain is to be contrasted with at least one blockchain, hereafter referred to as the "legally binding blockchain", which is used for registering documents with official nature. This blockchain is intended to provide a user with a legally binding publishing medium, with "legally binding signatures" of all users that are expected to provide their signature. In a preferred embodiment, each user disposes of at least one key pair for the authentication signatures and at least one key pair for the legally binding signatures. This is comparable to current practice with respect to key pairs relating to eIDs, such as Belgian eIDs. In such an eID, one key pair is present for authenticating purposes, e.g. relating to the receipt of a registered letter, and another key pair is present for legally binding signatures, e.g. relating to the submission of a tax-related statement from the user.

According to a further aspect of the invention, that is not intended to limit its scope in any way, the invention relates to following points 1-21.

1. Computer-implemented method for the collective signing of a PDF-based document (Portable Document Format) by a plurality of users, said method comprising the sequential realization of the following set of steps for each of said plurality of users:
   (a) providing to the user of said PDF-based document, and optionally one or more existing identifications strings belonging to said PDF-based document;
   (b) determining an identification string belonging to said PDF-based document based on at least said PDF-based document and optionally said one or more existing identification strings;
   (c) establishing a document signature based on at least both said identification string belonging to said PDF-based document and a private key belonging to the user;
   (d) registering said document signature in a blockchain; in which said identification string at least allows to identify said PDF-based document in a unique way with respect to the blockchain, in which said establishing in step (c) comprises encrypting said identification string by means of said private key belonging to a key pair belonging to said user for obtaining a signed identification string, said key pair comprising said private key and a public key, in which said document signature comprises said signed identification string; in which said document signature comprises a user identity for retrieving said public key; and in which said collective signing is realized when step (d) has been carried out for each user.

2. Method of point 1, characterized in that said determination in step (b) comprises the calculation of a hash from said PDF-based document by means of a cryptographic hash function, in which said identification string is determined based on at least said hash.

3. Method of any one of the points 1 and 2, characterized in that step (a) comprises, for at least one user belonging to said plurality of users, the provision of an existing identification string, that is, an identification string signed by another user belonging to said PDF-based document, in which said other user belongs to said plurality of users and is different from said user; and in which said determining of the identification string of step (b) for said at least one user takes place based on at least said identification string signed by another user.

4. Method of any of the previous points 1 to 3, characterized in that said blockchain is publicly accessible.

5. Method of any of the previous points 1 to 4, characterized in that said blockchain is the same for each of said plurality of users.

6. Method of any one of the previous points 2 to 5, characterized in that said document signatures comprises said non-encrypted hash as obtained in step (b).

7. Method of any of the previous points 1 to 6, characterized in that said registration in step (d) takes place provided that said user identity belongs to a plurality of user identities that have been registered in a web-of-trust.

8. Method of the previous point 7, characterized in that said web-of-trust is at least partially registered in said blockchain.

9. Method of any one of the previous points 2 to 8, characterized in that said PDF-based document comprises a document ID pair comprising a first document ID and a second document ID, in which the identification string determined in step (b) comprises said document ID pair, in which said document ID pair is unique with respect to the blockchain.

10. Method of any of the previous points 1 to 9, characterized in that said private key is saved on a hardware security module (HSM) and/or smart card and/or USB token.

11. Method of any one of the previous points 7 to 10, characterized in that a replacement of said key pair belonging to said user by a new key pair belonging to the same said user comprises a registration on said web-of-trust.

12. Method of any one of the previous points 1 to 11, characterized in that said blockchain overlaps at least partially with the technology of the bitcoin blockchain.

13. Method of any one of the previous points 2 to 12, characterized in that said cryptographic hash function belongs to the family of Secure-Hash-Algorithms (SHA).

14. Method of any of the previous points 2 to 13, characterized in that said document signature comprises a supplementary hash that is different from said hash as obtained in step (b) and different from said signing hash.

15. Method of any of the previous points 1 to 14, characterized in that said document signature comprises one or more signing-specific characteristics such as a status with respect to said document and/or said document signature.

16. Method of any one of the previous points 1 to 15, characterized in that said sequential realization of said set of steps for a first of said plurality of users constitutes a trigger for the sequential realization of said set of steps for at least a second of said plurality of users different from said first user.

17. Use of the method of any of the points 1 to 16 for building a history with respect to a document such as an identity-related document, in which said collective signing corresponds to the adding of a document signature to a logging-in at a document-related instance such as a customs check or a civil affairs department.

18. System for the collective signing of a PDF-based document by a plurality of users, said system comprising a plurality of mutually linked devices belonging to said plurality of users, each of the devices comprising a processor, tangible non-volatile memory, instructions in said memory for controlling said processor, a client application, in which for each device, the client application is configured for carrying out a method of any one of the previous points 1 to 16, in which a user identity for retrieving a public key for at least one of the users is linked one-to-one to the client application on the device belonging to said user.

19. System of point 18, characterized in that at least one of said plurality of devices comprises a hardware security module and/or smart card and/or USB token.

20. System of any one of the previous points 18 and 19, characterized in that a registration of a document signature in a blockchain takes place provided that said user identity belongs to a plurality of user identities that have been registered in a web-of-trust; and that the fact that the user identity linked to the client application is compromised, leads to the removal of said compromised user identity from said plurality of user identities that have been registered in said web-of-trust.

21. Computer program for carrying out a computer-implemented method for the collective signing of a PDF-based document by a plurality of users of any one of the previous points 1 to 16, which computer program product comprises at least one readable medium in which computer-readable program code portions are saved, which program code portions comprise instructions for carrying out said method.

In the following, the present invention is described based on non-limiting examples, for illustrating the invention in a particular embodiment.

EXAMPLE 1: DECENTRALIZED METHOD AND DECENTRALIZED SYSTEM

This example supposes a system of the present invention, whereby the files concern PDF-based documents. The system comprises a plurality of said devices, called SYSTEM entities here, that are mutually connected via a network such as the internet. Each SYSTEM entity comprises a CLIENT component and an HSM. The CLIENT component corresponds to said client application and can for example be built in a document management system that is available on the SYSTEM entity and/or a web browser that is available on the SYSTEM entity. The user identity, called IDENTITY specification here, is used to identify the person or the company that possesses the CLIENT component, the HSM and the SYSTEM entity. Said web-of-trust comprises each IDENTITY specification. A new IDENTITY specification is only trusted if it presents itself at the web-of-trust and is approved by a sufficient number of other IDENTITY specifications that are present on the web-of-trust, such as companies that know and trust each other. The web-of-trust is for example used when an HSM must be replaced or when the key pair on the HSM has expired, or because the encryption-algorithm used in combination with the key pair must be updated.

Each CLIENT component maintains a copy of the BLOCKCHAIN database composed of blocks, corresponding to said blockchain. Each block in the BLOCKCHAIN database comprises a list of said document ID pairs, said signed hashes of the PDF-based documents, and information about the user comprised in the user identity. The BLOCKCHAIN database itself is public, and doesn't give access to the content of documents. As to the possible distribution of documents, it is the SYSTEM entity that entirely decides. The signed hash is hereby called SIGNATURE, and is registered in combination with the document ID pair and the IDENTITY specification in the BLOCKCHAIN database. Hereby, the combination of SIGNATURE, document ID pair and IDENTITY specification corresponds to said document signature.

In this exemplary embodiment, the combination of document ID pair, SIGNATURE and IDENTITY specification is a unique and irrevocable proof of the existence of said document at a particular time. The registration of this combination in the blockchain as a result of a signature, the document signature, thus leads to the specification of the content of the document, and the creation of a link between the user who signs and the relevant document. In a preferred embodiment, this registration thus preceded the actual collective signing by different parties, but it does not necessarily have to be the case. In an alternative embodiment, the first registration of the document in the blockchain takes place at the first document signature within the framework of the collective signing.

After said first signature, a second and further signatures follow. In this way, it is controlled if all notifications in the blockchain for the same hash and/or document ID pair are valid. This must be the case, as the CLIENT application would not allow to add a corrupt SIGNATURE. In a preferred embodiment, the corresponding system comprises provisions prohibiting that signatures are made in the BLOCKCHAIN database with an IDENTITY specification which is known to be compromised, and already recorded signatures with corrupt SIGNATURE are marked as invalid. In a preferred embodiment, the existing invalid SIGNATURE is overruled by a new SIGNATURE, for which the private key is registered via the web-of-trust.

When all users that have been involved in the collective signing, have registered their document signature in the BLOCKCHAIN, the document is considered as being collectively signed.

In a preferred embodiment, the method of the present invention is used as a kind of acknowledgement of receipt. The editor of the document registers the first document signature in the BLOCKCHAIN and thus registers the origin. One or several receivers of the document register further document signatures in the BLOCKCHAIN for the same document, and thus confirm the receipt of the document.

EXAMPLE 2: USE IN THE LOGISTIC FIELD

In this example, the invention is applied to a document system. Documents are registered in a public blockchain that is the same for all users. The documents are registered with document signatures as described in the invention. All notifications of document signatures in the blockchain comprise one or more signing-specific characteristics, here PROPERTY SET, for storage of a status with respect to the document.

Preferably, all data that are present in the blockchain with respect to the document system are also saved in the document system, for allowing a fast processing at the level of the document system. This indeed allows to monitor which blocks of the blockchain are relevant for the document system, as a result of which the whole blockchain must not always be searched. This is thus assumed below.

The document system processes invoices. Each invoice corresponds to a particular document. This document is recorded in the blockchain when sending it to the client by means of a document signature. This document signature that has been recorded in the blockchain comprises as a value for the PROPERTY SET: status=SENT. Since the document signature is also saved in the document system, the time stamp of the blockchain to which the invoice has been registered, is also available in the document system. The user of the document system can thus go through all document signatures with respect to a particular invoice, and in case of a document signature, find the status SENT, accompanied with the date.

A courier service delivers a product and registers said invoice with as a value for the PROPERTY SET: status=DELIVERED. In this way, the document system constantly receives information about all documents that are known to the own system, but also about all documents that are known to other document systems. Each time a new block is added to the blockchain, the document system can check all document signatures that are present in the new block and check if there is a document signature with respect to a document that has been saved in the document system. If yes, a reference to that block and/or the position of that document signature in the blockchain is added to the document system. If a user of the document system looks at an invoice for which the goods have been delivered, he will then find two document signatures: one with status=SENT and one with status=DELIVERED.

Subsequently, the receiver of the goods sends an invoice to the bank for payment. Preferably, this is realized in the context of an electronic invoice system such as ZUGFeRD, in which each electronic invoice comprises all data that a bank needs to correctly make a payment. The bank can subsequently make a new document signature with as a value the PROPERTY SET: status=PAID. Thus, the invoice is not only checked as paid, but this is also explicitly confirmed by the relevant bank, by means of its user identity. As soon as the block with this status reaches the blockchain, this is detected by the document system. Subsequently, the user of the document system can see that the invoice has effectively been paid. This method has the advantage that it is (much) easier than the use of CODA files, and thus forms an alternative for the use of the latter. Furthermore, this method offers the advantage that the receiver of the invoice can find out if the invoice is "real" by means of the signatures, and if it is not a falsification. This clearly contrasts with a method of the state of the art, in which no solution is offers for invoices with false payment instructions. When the receiver does not observe the falsification and pays such invoice, then there are no provisions for finding out whether or not the invoice is false when paying in a method of the state of the art.

It will however be clear that this is only one possible example, in which the details have been left out for reasons of simplicity. Such tracking of the history is useful in the complete supply chain, including bill of ladings (CMR transport documents) and contracts. Another example is the deed of a house. Hereby, the corresponding document system would identify each real estate with a document with document signature in the blockchain. That document can be completed with additional information (post intervention file), in which the new information is each time registered in the blockchain by a new document and a new document signature, in which the link between the original document and the new document can e.g. be laid down because the first document ID belonging to the document ID pair is equal. In a related embodiment, all new document signatures are realized with reference to the original document, and for example only modify the date and the value for the PROPERTY SET. For the new document signature, this can for example be: owner="John Smith". Each time, the owner of the real estate changes, the document is again registered with another owner in the PROPERTY SET. In another embodiment, the principle of ownership is applied to pieces of art, in which the authenticity of the drawing, painting of any other kind of art is recorded in a certificate of authenticity.

The registration of the blocks and/or positions of specific document signatures in the blockchain that relate to the "own" documents, ensures a more efficient work flow: the document system does not have to search the complete blockchain to find a document. By means of references to the specific blocks, only the relevant blocks can directly be consulted. Such consulting is for example necessary to check the authenticity of the relevant documents and/or their signatures. The additional information that is added in a legible format in the blockchain, is public, and it is thus clear that it is up to each industry to decide which information (codes that indicate a status, address of a real estate, name of the owner, etc.) should be mentioned as a characteristic in the PROPERTY SET.

It will be understood that the present invention is not limited to the embodiments described above and that some adjustments or changes can be added to the described examples without changing the scope of the enclosed claims. The present invention has for example been described with reference to a separate blockchain destined for registered signature of PDF-based documents, but it will be clear that the invention can be applied with a blockchain that is acquainted with another use, such as for example the bitcoin blockchain. As a file format, PDF is also mentioned, but it can actually also be another file format. It can for example be a format for word processing or word display, but it can also be an image (either pixel based, or vector based), a media file such as an audio fragment or a film fragment, or a specialized file format such as e.g. a computer aided design (CAD) file.

The invention claimed is:

1. Computer-implemented method for the collective signing of a file, or a PDF-based document, by a plurality of users, said method comprising the sequential realization of the following set of steps for each of said plurality of users:
   (a) providing the user with said file, and with one or more existing identification strings belonging to said file;
   (b) determining an identification string belonging to said file based on at least said file and based on said one or more existing identification strings comprising the step of calculating a hash from said file by means of a cryptographic hash function, wherein said identification string is determined based on at least said hash;

(c) establishing a document signature based on at least both said identification string belonging to said file and a private key belonging to the user;

(d) registering said document signature in a blockchain; in which said identification string at least allows to identify said file, uniquely with respect to the blockchain, in which said establishing in step (c) comprises encrypting said identification string by means of said private key belonging to a key pair belonging to said user for obtaining a signed identification string, said key pair comprising said private key and a public key, in which said document signature comprises each of said non-signed hash as obtained in step (b) and said signed identification string; in which said document signature comprises a user identity for retrieving said public key; in which said collective signing is realized when step (d) has been carried out for each user, and this regardless of the sequence in which each of said plurality of users has signed.

2. Method of claim 1, wherein said file is a PDF-based document.

3. Method of claim 1, wherein said plurality of users comprises at least three users.

4. Method of claim 1, wherein step (a) comprises, for at least one user belonging to said plurality of users, the provision of the existing identification string, that is, an identification string signed by another user having access to said file, in which said other user is one of said plurality of users and is different from said user; and in which said determining of the identification string of step (b) for said at least one user takes place based on at least said identification string signed by another user.

5. Method of claim 1, wherein said registration in step (d) takes place provided that said user identity belongs to a plurality of user identities that have been registered in a web-of-trust or with a Certificate Authority.

6. Method of claim 1, wherein said private key is saved on a hardware security module (HSM), smart card or USB token.

7. Method of claim 5, wherein a replacement of said key pair belonging to said user by a new key pair belonging to the same said user comprises a registration on said web-of-trust or with said Certificate Authority.

8. Method of claim 1, wherein said document signature comprises one or more signing-specific characteristics, a status with respect to said document and said document signature.

9. Method of claim 1, wherein said sequential realization of said set of steps for a first of said plurality of users constitutes a trigger for the sequential realization of said set of steps for at least a second of said plurality of users different from said first user.

10. Method of claim 1, wherein said collective signing is performed for building a history with respect to a document or an identity-related document, in which said collective signing corresponds to the adding of a document signature to a logging-in at a document-related instance.

11. System for the collective signing of a file, or a PDF-based document, by a plurality of users, said system comprising a plurality of mutually linked devices belonging to said plurality of users, each of the devices comprising a processor, tangible non-volatile memory, instructions in said memory for controlling said processor, a client application, in which for each device, the client application is configured, computer-implemented method for the collective signing of a file, or a PDF-based document, by a plurality of users, said method comprising the sequential realization of the following set of steps for each of said plurality of users:

(a) providing the user with said file, and with one or more existing identification strings belonging to said file;

(b) determining an identification string belonging to said file based on at least said file and based on said one or more existing identification strings comprising the step of calculating a hash from said file by means of a cryptographic hash function, wherein said identification string is determined based on at least said hash;

(c) establishing a document signature based on at least both said identification string belonging to said file and a private key belonging to the user;

(d) registering said document signature in a blockchain; in which said identification string at least allows to identify said file, uniquely with respect to the blockchain, in which said establishing in step (c) comprises encrypting said identification string by means of said private key belonging to a key pair belonging to said user for obtaining a signed identification string, said key pair comprising said private key and a public key, in which said document signature comprises each of said non-signed hash as obtained in step (b) and said signed identification string; in which said document signature comprises a user identity for retrieving said public key; in which said collective signing is realized when step (d) has been carried out for each user, and this regardless of the sequence in which each of said plurality of users has signed in which a user identity for retrieving a public key for at least one of the users is linked one-to-one to the client application on the device belonging to said user.

12. System of claim 11, wherein at least one of said plurality of devices comprises a hardware security module, smart card or USB token.

13. System of claim 11, wherein a registration of a document signature in a blockchain takes place provided that said user identity belongs to a plurality of user identities that have been registered in a web-of-trust and/or with a Certificate Authority; and that the fact that the user identity linked to the client application is compromised, leads to the removal of said compromised user identity from said plurality of user identities that have been registered in said web-of-trust and/or with said Certificate Authority.

14. Computer program stored in memory for carrying out collective signing of a file, or a PDF-based document, by a plurality of users, computer-implemented method for the collective signing of a file, or a PDF-based document, by a plurality of users, said method comprising the sequential realization of the following set of steps for each of said plurality of users:

(a) providing the user with said file, and with one or more existing identification strings belonging to said file;

(b) determining an identification string belonging to said file based on at least said file and based on said one or more existing identification strings comprising the step of calculating a hash from said file by means of a cryptographic hash function, wherein said identification string is determined based on at least said hash;

(c) establishing a document signature based on at least both said identification string belonging to said file and a private key belonging to the user;

(d) registering said document signature in a blockchain; in which said identification string at least allows to identify said file, uniquely with respect to the blockchain, in which said establishing in step (c) comprises encrypting said identification string by means of said private key belonging to a key pair belonging to said user for obtaining a signed identification string, said key pair comprising said private key and a public key, in which said document signature comprises each of said non-signed hash as obtained in step (b) and said signed identification string; in which said document signature comprises a user identity for retrieving said public key; in which said collective signing is realized when step (d) has been carried out for each user, and this regardless of the sequence in which each of said plurality of users has signed, which computer program product comprises at least one readable medium in which computer-readable program code portions are saved, which program code portions comprise instructions for carrying out the collective signing.

15. Method of claim 1 further comprising carrying out a search for a non-signed hash.

* * * * *